(12) United States Patent
Soltys et al.

(10) Patent No.: US 7,950,661 B2
(45) Date of Patent: May 31, 2011

(54) WIRELESS MONITORING OF A CARD GAME AND/OR WAGERS IN GAMING

(75) Inventors: Richard Soltys, Newcastle, WA (US); Richard Huizinga, Newcastle, WA (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 12/542,974

(22) Filed: Aug. 18, 2009

(65) Prior Publication Data

US 2010/0035675 A1 Feb. 11, 2010

Related U.S. Application Data

(62) Division of application No. 10/823,051, filed on Apr. 13, 2004, now Pat. No. 7,575,234.

(51) Int. Cl.
*A63B 71/00* (2006.01)
*A63F 13/00* (2006.01)
(52) U.S. Cl. ............... 273/138.2; 273/295; 273/292; 463/16; 463/40; 463/43

(58) Field of Classification Search ............... 463/16, 463/22, 40; 235/492, 494; 273/149 P
See application file for complete search history.

(56) References Cited

U.S. PATENT DOCUMENTS

| | | | | |
|---|---|---|---|---|
| 5,735,742 A | * | 4/1998 | French | 463/25 |
| 7,077,332 B2 | * | 7/2006 | Verschuur et al. | 235/492 |
| 2003/0064774 A1 | * | 4/2003 | Fujimoto et al. | 463/16 |

* cited by examiner

*Primary Examiner* — Dmitry Suhol
*Assistant Examiner* — Alex F. R. P Rada, II
(74) *Attorney, Agent, or Firm* — David N. Caracappa

(57) ABSTRACT

A method for automating a card game includes wirelessly interrogating each of a plurality of playing cards using radio frequency transmissions. For at least some of the playing cards, determining a rank of the playing card is based on the wireless interrogation using a mapping stored on a computer-readable medium that uniquely identifies playing cards based on a random distribution of conductive material carried by each of the playing cards.

12 Claims, 9 Drawing Sheets

WIRELESS MONITORING OF A CARD GAME AND/OR WAGERS IN GAMING

FIELD OF THE INVENTION

The present description generally relates to gaming, and in particular to games played with playing cards.

DESCRIPTION OF THE RELATED ART

Casinos and other forms of gaming are a multi-billion dollar worldwide industry. Typically, a player exchanges currency or a form of credit for a casino's chips. The player places the chips as wagers at various games, such as blackjack, baccarat, poker, and other well-known card games. A game operator, such as a dealer, distributes or deals the playing cards, pays out winning wagers with additional chips based on the set of odds for the particular game, and/or collects losing wagers. The odds of each game slightly favor the casino, so on average the casino wins and is profitable.

Thousands of card hands may be dealt per hour. Like many businesses, casinos wish to monitor these transactions as closely as possible. Monitoring may help the casino identify cheating by players and/or dealers. Monitoring may also allow the automation of various functions, such as accounting, to improve business efficiency, servicing of the tables including the delivery of extra chips when needed, and/or may providing incentives (i.e., "comps") to players based on their activity at the gaming table. Many casinos employ individuals commonly referred to as "pit bosses" to visually monitor the gaming activity including the dealing of cards, placing of wagers, payout of winning wagers and collection of losing wagers. A number of automated devices have been proposed for assisting casinos in monitoring the gaming activity. For example, card readers which optically or magnetically scan either standard or special markings on the playing cards to identify the playing cards as they are dealt. Optical scanners have also been proposed for reading markings carried by wagering chips, such as barcodes. Further, radio frequency identification ("RFID") transceivers have been proposed for reading RFID tags incorporated in wagering chips.

The use of optical markings has a number of distinct drawbacks. For example, these markings degrade during use for example due to excessive handling and/or spills or stains, and thus become difficult or impossible to read. Optical markings are also difficult to read in the uncontrolled visual environment common in casinos. For example, optical systems rely on line-of-sight, which may be blocked in the uncontrolled visual environment of a gaming table, for example, by a drink or other object placed on the gaming table. Further, players and other casino customers wear a large variety of colors in their clothing, which clutters the visual background, making the optical marking difficult or impossible to read.

Magnetic marking also has a number of distinct drawbacks. For example, these markings also degrade during use, for example due to excessive handling, and thus become difficult or impossible to read. Magnetic markings must be placed in very close proximity to the reader, which typically requires the swiping of the magnetic marking through a slot in the reader. This would unduly interfere with the playing of traditional card games.

RFID technology has other distinct drawbacks. RFID technology relies on a semiconductor chip coupled to an antenna. The cost of these RFID chips is rather high, currently on the order of $1.50-$2.50 per chip. Thus each set of 52 playing cards would cost between $78 and $130, prohibitively expensive for practical use given the extremely large number of playing card sets each casino uses. While these RFID chips tend to be very thin, they are still rather large when compared with the thickness of a playing card. Thus it is difficult to incorporate an RFID chip in a playing card. For example, an RFID chip laminated in a playing card may be detectable as a lump or bump by players, causing the players to reject the playing cards and take their business to other casinos. The RFID chip may throw off the balance of the playing card, again causing players to chose other casinos. The increase in thickness in the playing card may interfere with existing casino systems, such as automatic shuffle devices.

It is desirable to have a system and method that allows a casino to efficiently automate a card game by identifying and/or monitoring playing cards. It is further desirable to have a common system and method that allows casinos to efficiently identify and monitor both playing cards and wagers.

BRIEF SUMMARY OF THE INVENTION

In accordance with principles of the present invention, a method for automating a card game includes wirelessly interrogating each of a plurality of playing cards using radio frequency transmissions. For at least some of the playing cards, determining a rank of the playing card is based on the wireless interrogation using a mapping stored on a computer-readable medium that uniquely identifies playing cards based on a random distribution of conductive material carried by each of the playing cards.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements and angles are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of the various embodiments of the invention. However, one skilled in the art understands that the invention may be practiced without these details. In other instances, well-known structures associated with transmitters, receivers, transceivers, antennas, and computing systems, have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

The headings provided herein are for convenience only and do not interpret the scope or meaning of the claimed invention.

Figure 1:
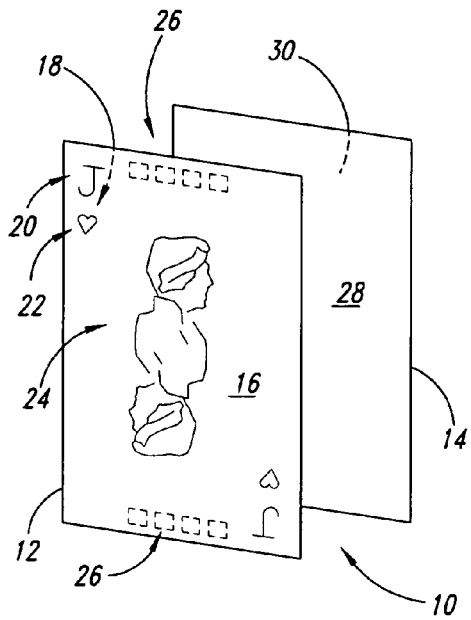
FIG. 1 is an isometric exploded view of a playing card according to a first embodiment, where conductive material is deposited on an inner surface of a face substrate and covered with a back substrate, in accordance with principles of the present invention.

FIG. 1 shows a playing card 10 formed from a face substrate 12 and a back substrate 14. The face substrate 12 includes an outer surface 16 and an opposed inner surface 18. The outer surface carries various indicia such as a rank marking 20 (e.g., two-ten, jack, queen, king, ace), suit markings 22 (e.g., heart, diamond, club, spade), pips (not shown), and/or illustrations 24. The inner surface 18 of the face substrate 12 carries conductive material 26. The back substrate 14 includes an inner surface 28 and an outer surface 30. The back substrate 14 overlies the conductive material 26 to provide electrical insulation and/or physical protection to the conductive material 26. The back substrate 14 may be joined to the face substrate 12 through any suitable means, for example, lamination. Where the back substrate 14 forms an outer layer of the playing card 10, the outer surface 30 typically carries a decorative pattern that is identical from playing card to playing card.

The number, placement and/or size of the conductive material may be selected based on the rank and/or suit of the playing card 10, to uniquely encode identifying information for the particular rank and/or suit. Additionally, or alternatively, these same parameters can be selected to encode identifying information such as a serial number (numeric, alpha, alpha-numeric or otherwise), to unique identify the playing card 10 with respect to any other playing card used in the casino (e.g., unique with respect to hundreds or thousands of decks of playing cards).

Figure 2:
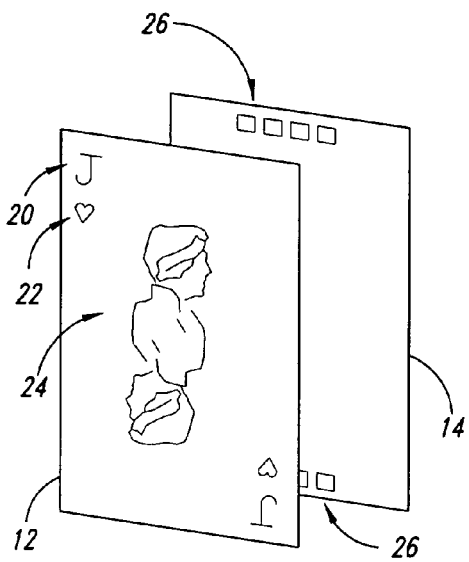
FIG. 2 is an isometric exploded view of a playing card according to a second embodiment, where conductive material is deposited on an inner surface of the back substrate and covered by the face substrate, in accordance with principles of the present invention.

FIG. 2 shows an alternative embodiment of the playing card 10. This alternative embodiment, and those alternative embodiments and other alternatives described herein, are substantially similar to previously described embodiments, and common acts and structures are identified by the same reference numbers. Only significant differences in the operation and structure are described below.

In contrast to the embodiment of FIG. 1, in the embodiment of FIG. 2 the back substrate 14 carries the conductive material 26. The face substrate 12 overlies the conductive material 26 to provide electrical insulation and/or physical environmental protection.

Figure 3:
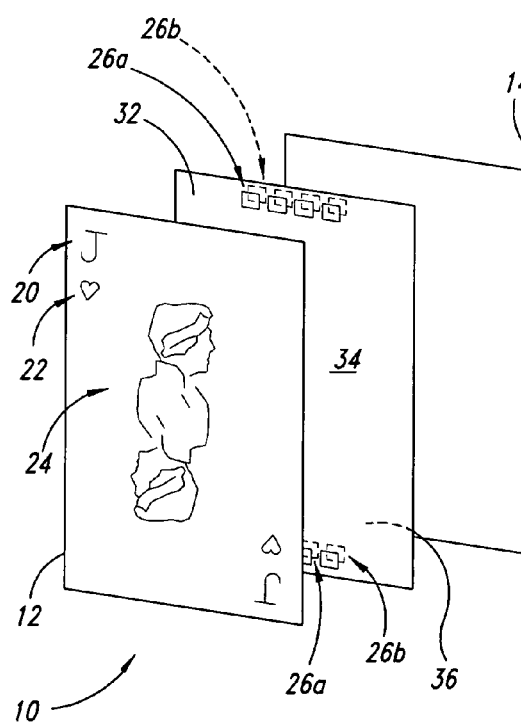
FIG. 3 is an isometric exploded view of a playing card according to a third embodiment, where conductive material is deposited on two surfaces of an intermediary base substrate and covered by the face substrate and back substrate, in accordance with principles of the present invention.

FIG. 3 shows a playing card 10 formed of the face substrate 12, back substrate 14, and intermediate base substrate 32. The base substrate 32 includes first and second opposed surfaces 34, 36 each of which bear conductive material 26. The base substrate 32 may consist of an electrically insulative or dielectric material. The conductive material 26a on the first face 34 may be in registration with the conductive material 26b on the second face 36 to produce a capacitive effect. Identifying information may be encoded into the playing card 10 by varying the number, placement, and/or size of the capacitors formed by the conductive material 26a, 26b.

Figure 4:
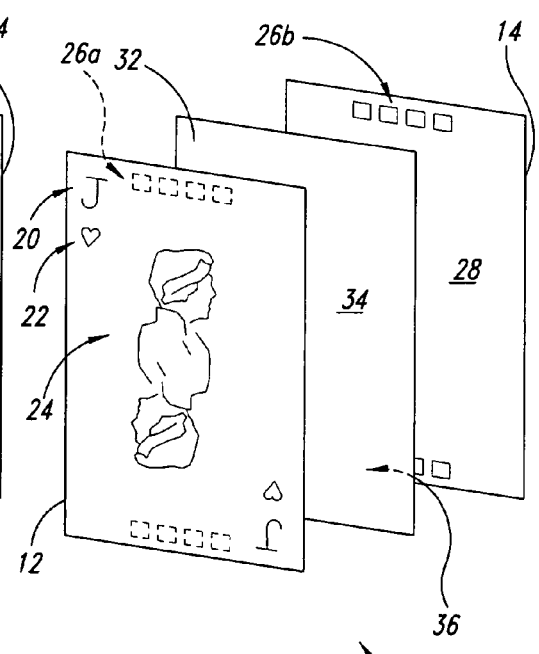
FIG. 4 is an isometric exploded view of a playing card according to a fourth embodiment, where conductive material is deposited on an inner surface of both the face substrate and the back substrate, and an insulating or dielectric intermediate base substrate is positioned there between, in accordance with principles of the present invention.

FIG. 4 shows a playing card 10 comprising the face substrate 12, back substrate 14, and intermediary base substrate 32. In the embodiment of FIG. 4, the inner surface 18 of the face substrate 12 bears the conductive material 26a, while the inner surface 28 of the back substrate 14 bears the conductive material 26b. As in the embodiment of FIG. 3, the intermediary substrate 32 may be formed of an electrically insulative material or dielectric material. Further, the conductive material 26a may be in registration with the conductive material 26b to produce a capacitive effect to encode identifying information.

Figure 5:
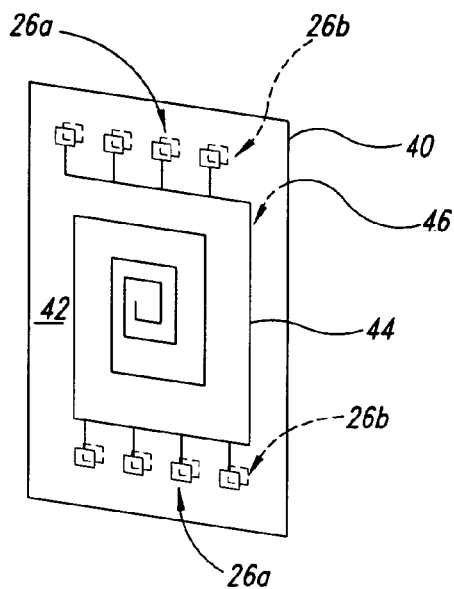
FIG. 5 is an isometric view of conductive material deposited on a substrate electrically coupled to an antenna, in accordance with principles of the present invention.

FIG. 5 shows a substrate 40 having a first surface 42 carrying conductive material 26a and an antenna 44. The antenna 44 may take the form of a conductive trace deposited or otherwise applied to the surface 42 and electrically coupled to the conductive material 26a to form a resonance circuit resonant at a particular resonance frequency. Optionally, a second surface 46 may carry conductive material 26b, positioned with respect to the conductive material 26a and spaced therefrom to produce a capacitive effect, to form a resonance circuit resonant at particular resonance frequency.

Figure 6:
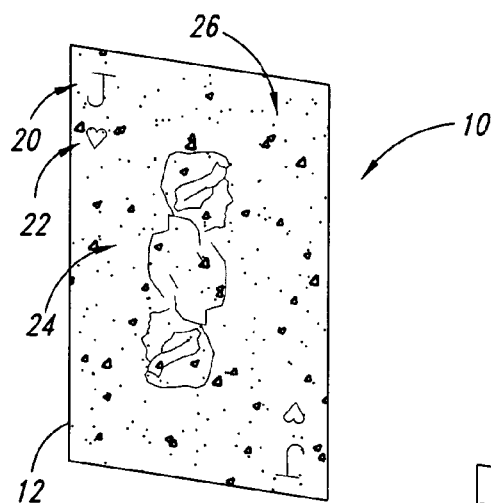
FIG. 6 is an isometric view of a playing card according to another embodiment, where conductive material is distributed in the substrate of the playing card, in accordance with principles of the present invention.

FIG. 6 shows a playing card 10 having conductive material 26 distributed throughout the face substrate 12. The playing card 10 may or may not include a back substrate 14 and/or intermediate base substrate. The distribution of conductive material 26 may be unique to the rank and/or suit of the playing card 10 for uniquely identifying the playing card 10 from other playing cards in the set. Additionally, or alternatively, the distribution of conductive material 26 may uniquely identifying the playing card 10 from all other playing cards used on the casino (e.g., unique with respect to hundreds or thousands of decks of playing cards). The conductive material 26 may be distributed in a controlled manner. Alternatively, the approach may take advantage of deliberate or un-deliberate statistical deviations in the manufacturing process to produce a random distribution of the conductive material 26. The random distribution of conductive material 26 can later be matched or mapped to a rank and/or suit of the playing card 10 to uniquely identify the rank and/or suit of the playing card in a set of playing cards. Additionally or alternatively, the random distribution of conductive material 26 can later be matched or mapped to uniquely identify the playing card 10 from all other playing cards used in the casino (e.g., unique with respect to hundreds or thousands of decks of playing cards). Data representing the mapping may be supplied in computer-readable form, along with the playing cards.

Figure 7:
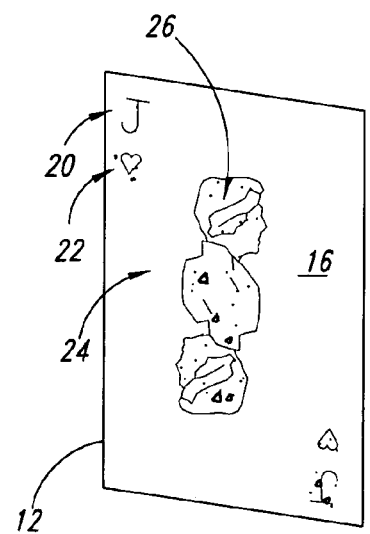
FIG. 7 is an isometric view of a playing card according to a further embodiment, where conductive material is distributed in ink used to form indicia on the face or back of the playing card, in accordance with principles of the present invention.

FIG. 7 shows a playing card 10 in which the conductive material 26 is distributed in the printed indicia such as the rank 20, suit 22 or illustration 24. The conductive material 26 may be mixed into an ink which is then applied to the face 16 of the face substrate 12. Alternatively, the conductive material 26 may be distributed in ink that is then applied to a back surface of the substrate 12, for example in back designs common on typical playing cards. Alternatively, the conductive material 26 may be deposited into the ink after the ink is applied to the playing card 10. As in the embodiment of FIG. 6, the distribution may be controlled or uncontrolled, deliberate or un-deliberate to uniquely identify the rank, and/or suit, and/or playing card 10.

Figure 8:
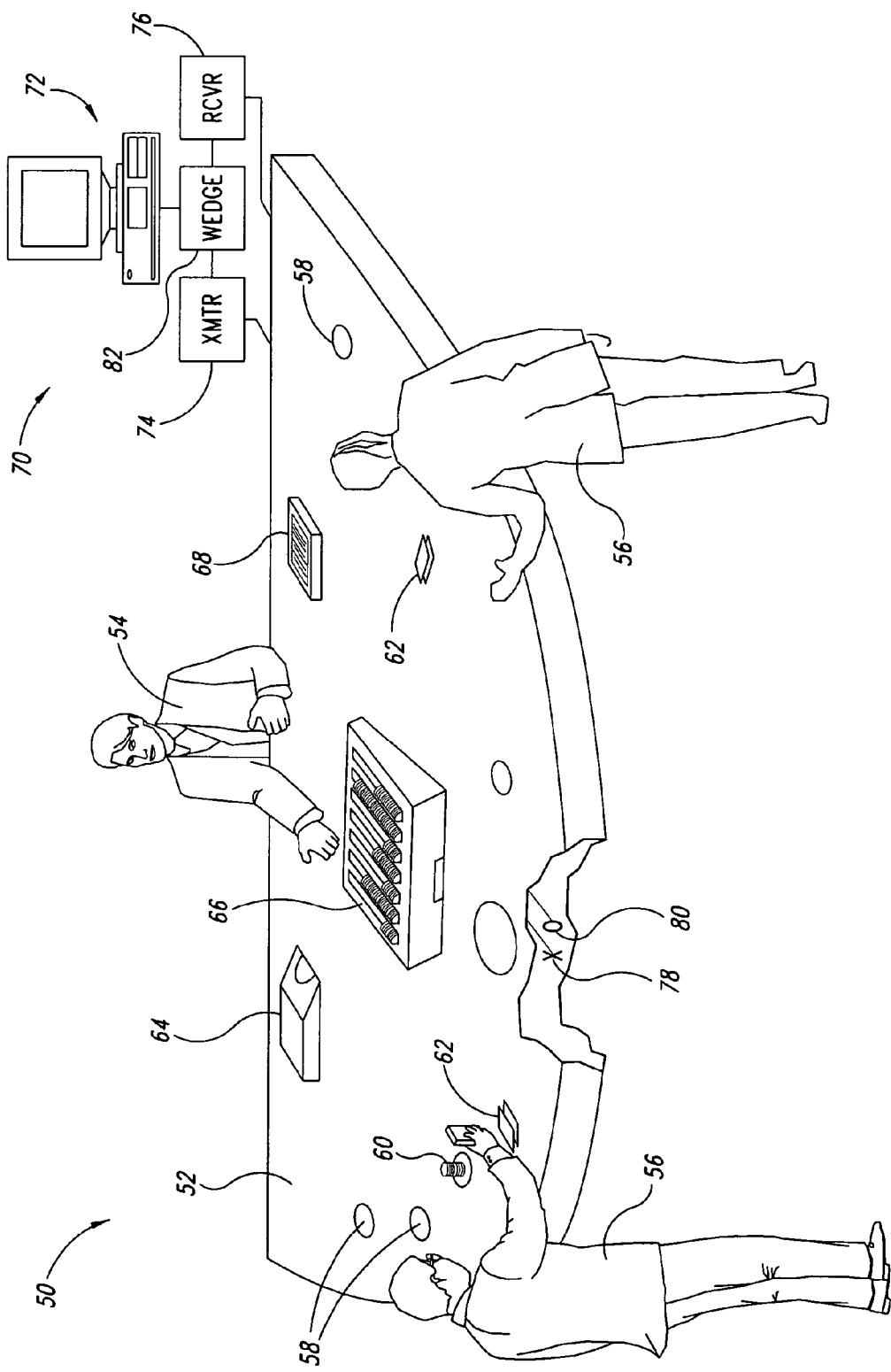
FIG. 8 shows a gaming environment including a gaming table, card shoe, chip tray and discard shoe and automated monitoring system, allowing monitoring of a card game dealt by a dealer to players, and collection and payment wagers, in accordance with principles of the present invention.

FIG. 8 shows a gaming environment 50 including a gaming table 52 operated by a dealer 54 and at which players 56 play. The game table 52 may include a number of areas known as bet circles 58 for placing wagers represented by chips 60. The dealer 54 may deal playing cards 62 from a card shoe 64 which holds one or more decks of cards, typically up to eight decks. The dealer 54 may pay winning wagers using chips taken from a chip tray 66 and/or collect losing wagers by retrieving the wagered chips 60 and placing the retrieved chips in the chip tray 66. The dealer 54 may optionally return playing cards 62 collected at the end of each round or game to an optional discard shoe 68. Casinos typically define an order in which playing cards 62 are collected. This allows the individual hands to be recreated if a player later challenges the outcome, even after the playing cards 62 are collected.

An automated wireless system 70 may wirelessly monitor playing cards and/or chips. The system 70 includes a computing system 72 controllingly coupled to a transmitter 74 and receiver 76. In some embodiments, the transmitter 74 and receiver 76 may be formed as a single transceiver. The transmitter is coupled to one or more antennas 78, and the receiver is coupled to one or more antennas 80. For example, the transmitter 74 may be coupled to an antenna 78 positioned in or on the gaming table 52. The receiver 76 may be coupled to an antenna 80 positioned in, or on, the gaming table 52. The antennas 78, 80 may be positioned at a central location, or respective antennas 78, 80 may be positioned proximate each of the bet circles 58, respectively. Antennas 78, 80 may also be positioned in the card shoe 64, chip tray 66, and/or discard shoe 68. The system 70 may include a wedge or similar device between the computing system 72 and the transmitter 74 and/or receiver 76 for converting RF signals into data suitable for processing by the computing system 72 (e.g., converting RF signals into formatted ASCII data).

Figure 9:
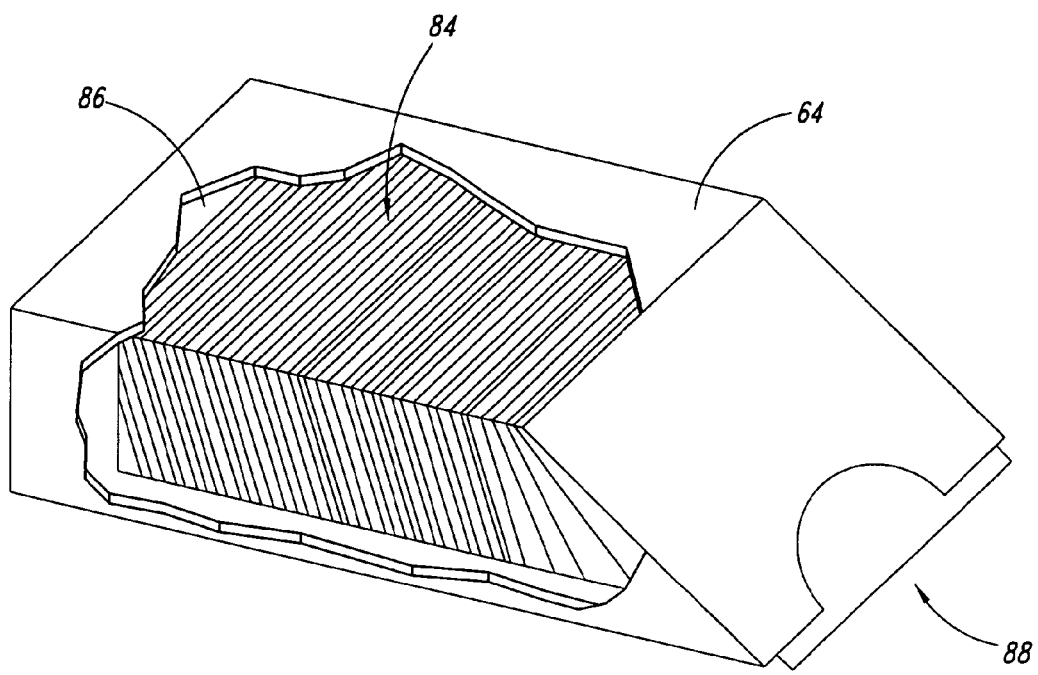
FIG. 9 is an isometric broken view of a card shoe, in accordance with principles of the present invention, holding a plurality of playing cards.
Figure 10:
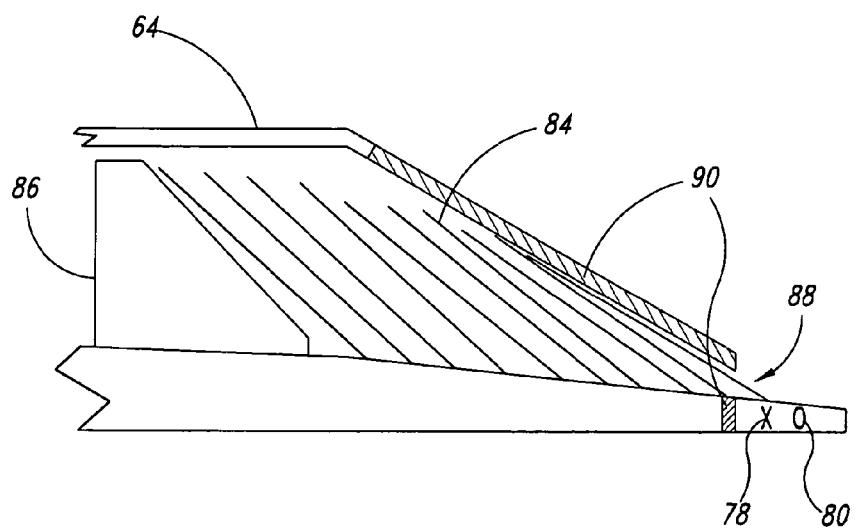
FIG. 10 is a partial cross-sectional view of a portion of the playing card shoe of FIG. 9, in accordance with principles of the present invention.

FIGS. 9 and 10 show the card shoe 64 including a plurality of playing cards 84 and a block or weight 86 for urging the playing cards 84 towards a slot 88. A portion 90 of the card shoe 64 may be formed of a radio frequency impervious, resistant or absorbent material, thereby forming an RF barrier isolating all but one playing card from the antennas 78, 80 at a time. Thus, each playing card will be wirelessly interrogated as it is removed from the card shoe 64 by way of the slot 88, without interference by the other playing cards 84 in the card shoe 64.

Figure 11:
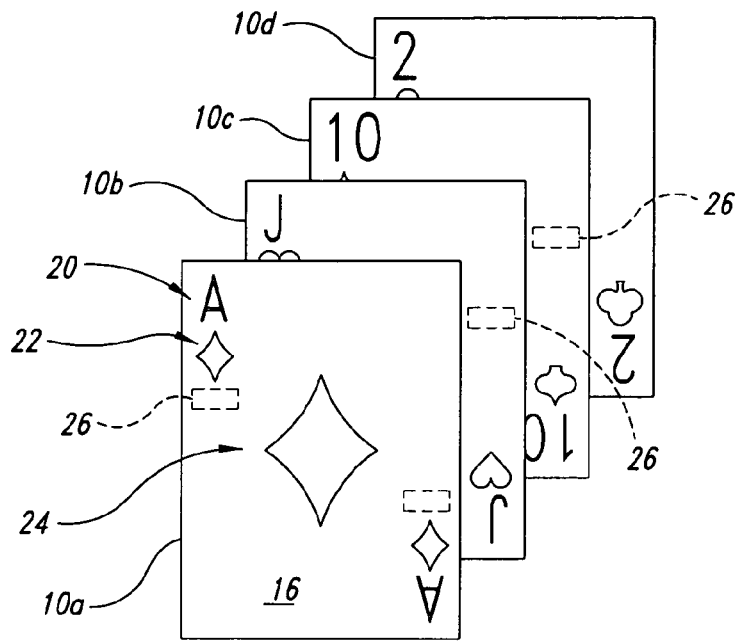
FIG. 11 is a plan view of a number of playing cards according to a further embodiment where a position of a conductive material on the playing card corresponds to an identity of the playing card, in accordance with principles of the present invention.

FIG. 11 shows a number of playing cards 10 according to an alternative embodiment where the position of the conductive material 26 corresponds to the rank 20 and/or suit 22 of the playing card 10. For example, playing cards with the value of eleven or one (e.g., ACE) may carry the conductive material 26 in the upper left and lower right quadrants of the face 16 as illustrated in FIG. 11. Playing cards 10b, 10c having a value of 10 (e.g., ten, Jack, Queen, King) may carry the conductive material 26 in the upper right and lower left quadrants of the face 16 of the playing card. Playing cards having other values 10d (two-nine) may not carry conductive material 26 or may carry conductive material 26 in other positions on the face 16.

Figure 12:
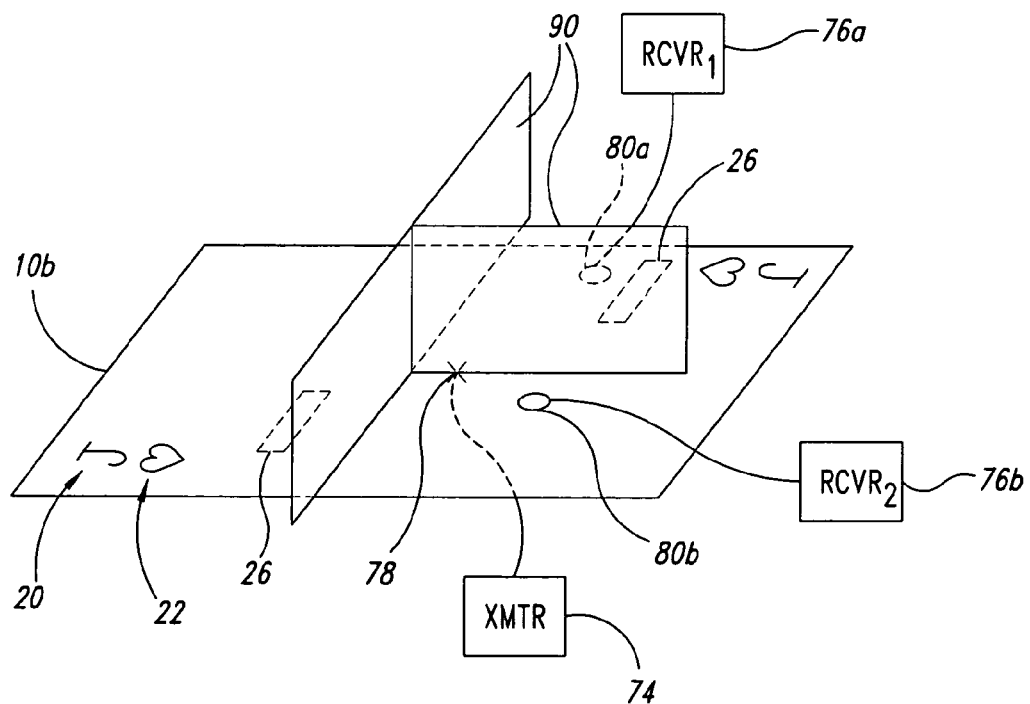
FIG. 12 is an isometric view of one of the playing cards of FIG. 11, in accordance with principles of the present invention, positioned relative to transmitting and receiving antennas and an radio frequency barrier.

FIG. 12 shows one of the playing cards 10b of FIG. 11, positioned in a playing card reader such as the card shoe 64 or discard shoe 58. In this embodiment, the radio frequency barrier 90 isolates two quadrants of the playing card. The antenna 78 coupled to the transmitter 74 is positioned below the card 10b and barrier 90 to radiate both quadrants of the playing card 10b isolated by the barrier 90. The antennas 80a, 80b are positioned in respective quadrants, isolated by the barrier 90. The antennas 80a, 80b may be electrically coupled to respective receiver 76a, 76b or alternatively to a single receiver 76. Thus, interrogation via the transmitter 74 and antenna 78 may result in resonance of the conductive material 26 which would be detected by the antenna 80a and receiver 76a, but not detected by the antenna 80b and receiver 76b due to the barrier 90. Thus, it may be determined whether the playing card 10 has a value of ten, or whether the playing card is an ACE having a value of eleven or one. This embodiment is particularly suitable for games of blackjack, but may be suitable for other card games with or without modifications which will be apparent to one skilled in the art.

Figure 13:
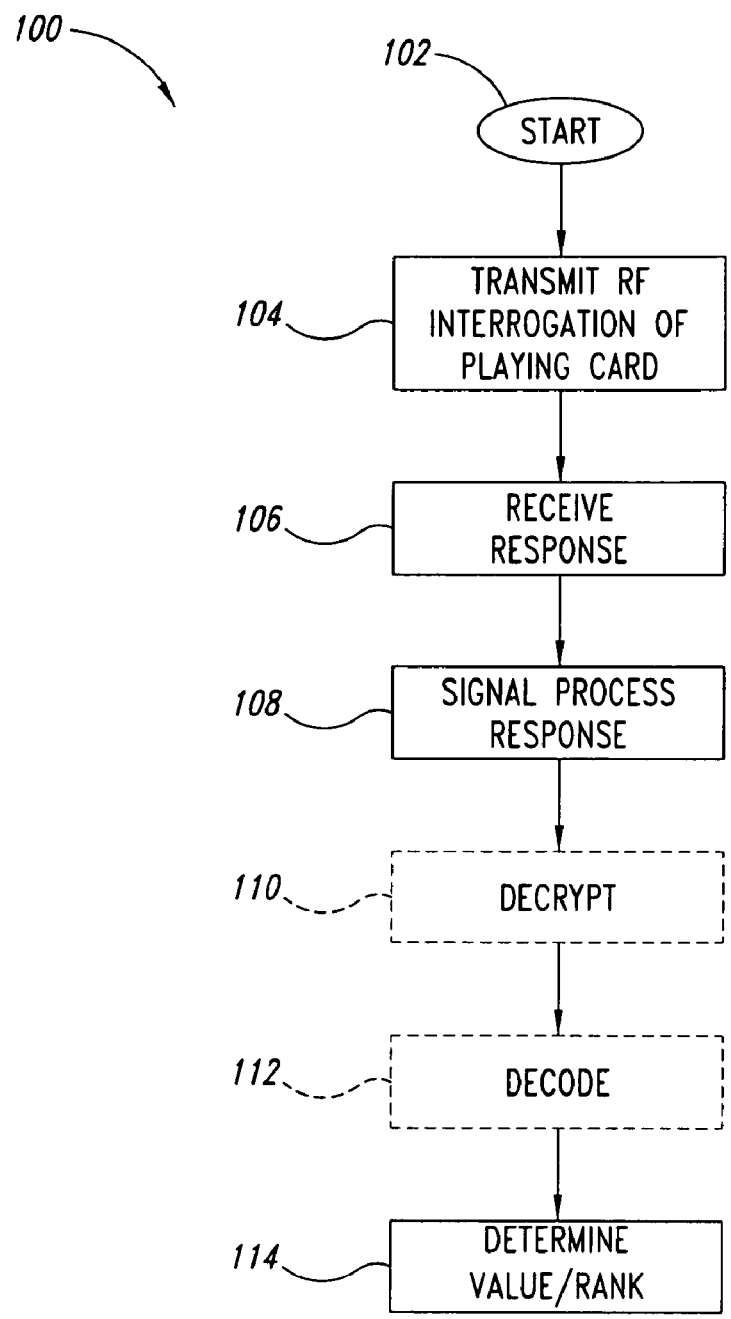
FIG. 13 is a flow diagram of a method of wirelessly identifying playing cards, in accordance with principles of the present invention.

FIG. 13 shows a method 100 of wirelessly reading a playing card starting in step 102. In step 104, the transmitter 74 and antenna 78 transmit a radio frequency interrogation signal. In response, the conductive material 26 resonates at a characteristic resonance frequency corresponding to at least the rank/value 20 and/or suit 22 of the playing card. In step 106, the receiver 76 and antenna 80 receive the response from the playing card 10. In step 108, the computing system 72 and/or wedge 82 signal process the response. In an optional step 110, the computing system 72 decrypts the received response. In optional step 112, the computing system 72 decodes the received signal or the decrypted signal. In step 114, the computing system 72 determines the value and/or rank of the playing card 10 based on the received response. Additionally or alternatively, the computing system 72 may determine a serial number as part of determining the value and/or rank of the playing card 10.

Figure 14:
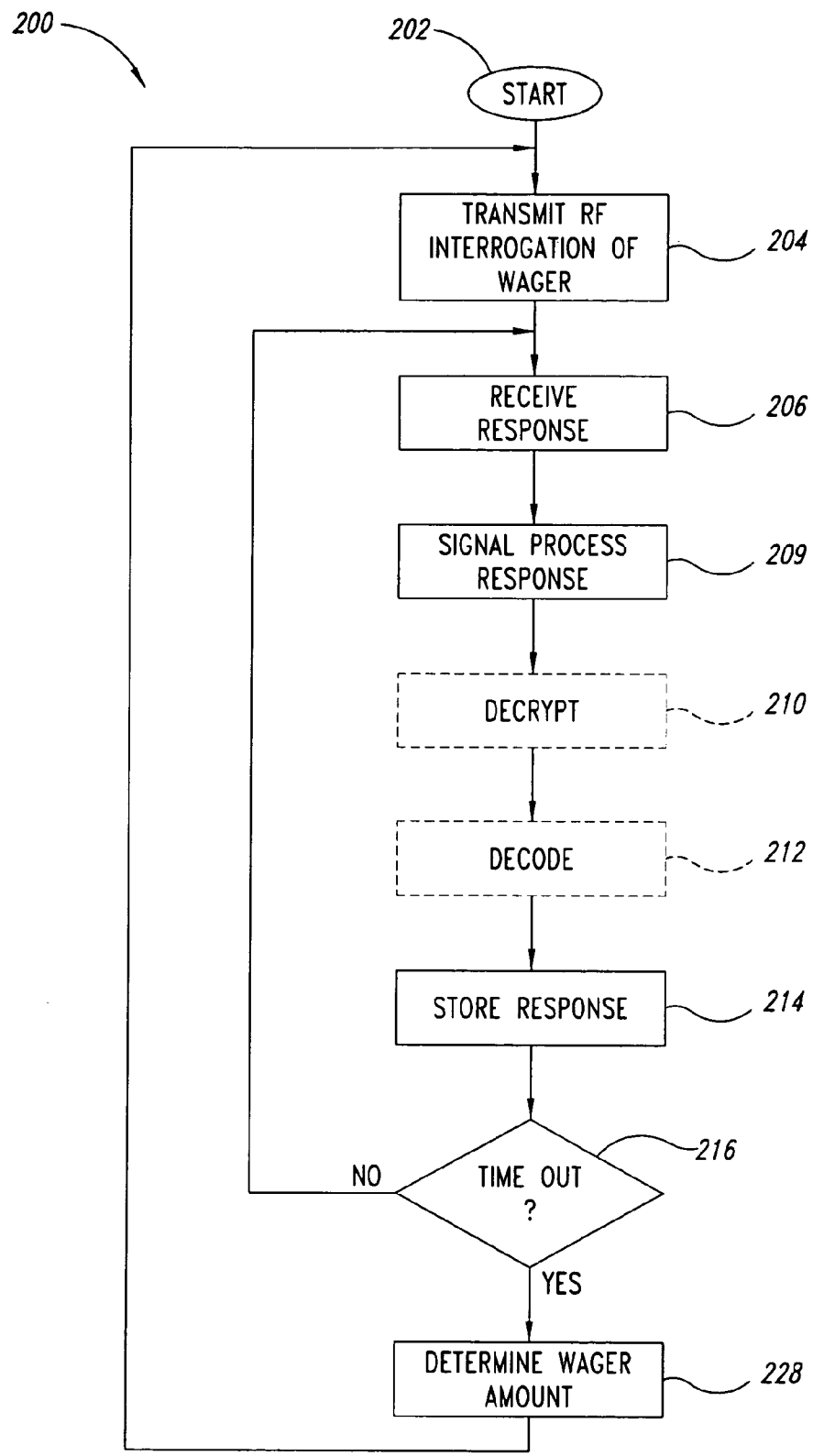
FIG. 14 is a flow diagram of a method of wirelessly identifying wagers, in accordance with principles of the present invention.

FIG. 14 shows a method 200 of wirelessly identifying wagers starting in step 202. In step 204, the transmitter 74 and antenna 78 transmit a radio frequency interrogation signal. In step 206, the receiver 76 and antenna 80 receive a response from one or more chips 60 representing a wager. The chips 60 may include conductive material 26 distributed or deposited in, or on, the chips 60 in a fashion similar to that of the playing cards 10 described above. Alternatively, since the chips 60 are typically much thicker than a playing card 10, the chips 60 may include an RFID semiconductor chip or wafer and antenna structure.

In step 209, the computing system 72 and/or wedge 82 processes the received response. In optional step 210, the computing system 72 decrypts the received response. In optional step 212, the computing system 72 decodes the received and/or decrypted response. In step 214 the computing system 72 stores the response. In step 216, the computing system 72 determines whether a timeout has been exceeded. If a timeout has not been exceeded, the method 200 returns control to step 206. If the timeout has been exceeded, the computing system 72 determines the wager amount in step 228. Control may then return to step 204 to identify further wagers.

The methods 100, 200 may employ polling or other techniques common in the RFID arts for identifying individual playing cards 10 and/or chips 60 from groups of playing cards and/or chips.

Figure 15:
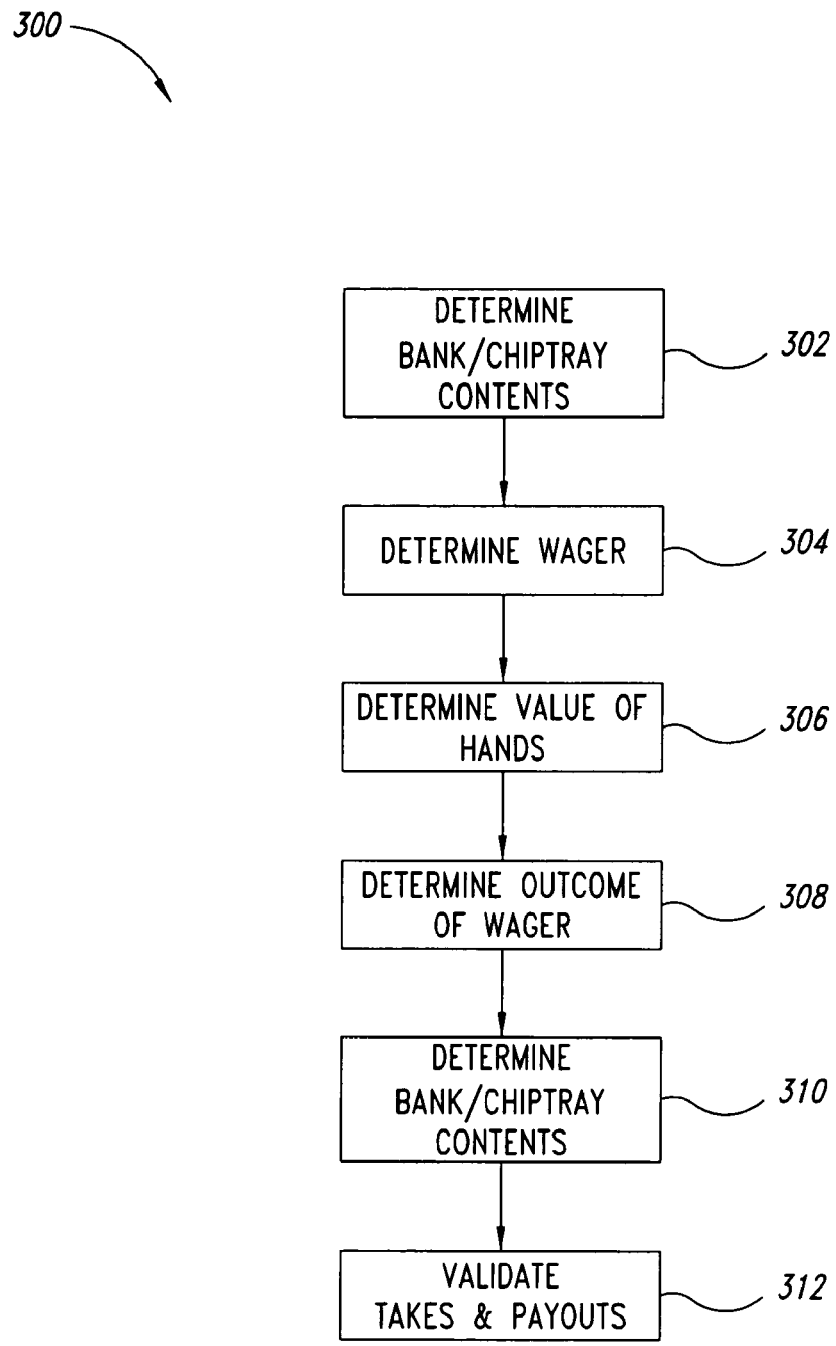
FIG. 15 is a flow diagram of a method of wirelessly monitoring a playing card game, in accordance with principles of the present invention.

FIG. 15 shows a method 300 of monitoring a playing card game. In step 302, a computing system 72 determines the contents of a bank or chip tray 66. The contents of the chip tray 66 may be determined in a similar fashion to that of the wagers, employing one or more transmitters 74 and antennas 78 as well as receivers 76 and antennas 80 positioned on or approximate the chip tray 66.

In step 304, the computing system 72 determines the number and size of the wagers. The computing system 72 may employ one or more transmitters 74 and antennas 78 as well as receivers 76 and antennas 80 positioned at or proximate the bet circles 58.

In step 308, the computing system 72 determines the outcome of a wager. The computing system 72 may employ one or more transmitters 74 and antennas 78 as well as receivers 76 and antennas 80 positioned in or proximate the card shoe 64, discard shoe 68 and/or player positions. Thus, the computing system 72 relies on the received responses to identify the values of the playing cards 10 and thus the value of the hands held by the players 56 and dealer 54, and compares these values to determine outcomes. The computing system 72 may further employ a defined set of odds to determine the value of the payouts.

In step 310, the computing system 72 determines the contents of the bank or chip tray 66 in a similar fashion to that described in step 302. In step 312, the computing system 72 validates the takes and payouts by comparing the contents of the chip tray 66 determined in step 310 with that determined in step 302. Discrepancies can be identified and appropriate notifications provided.

Figure 16:
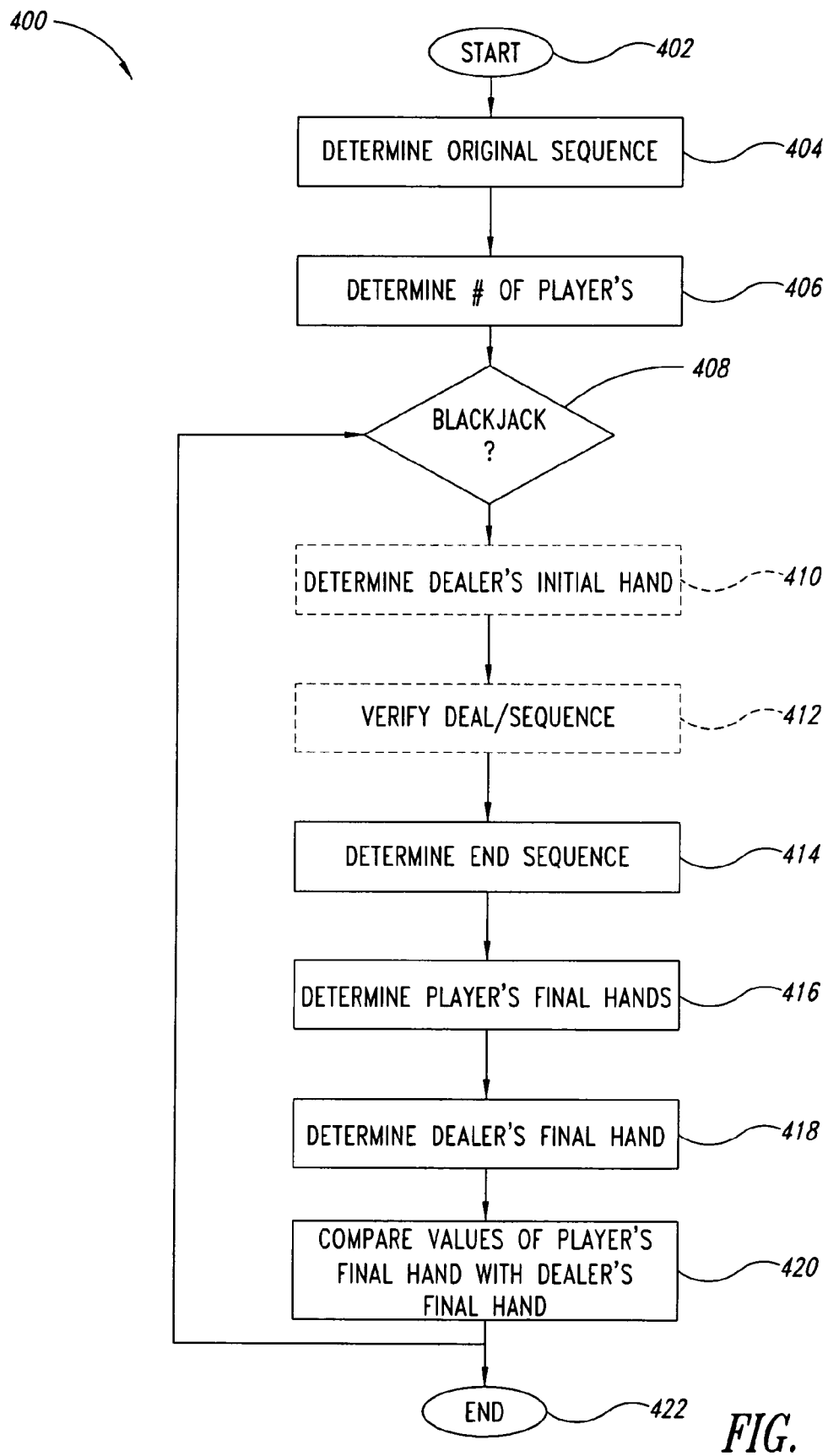
FIG. 16 is a flow diagram of an method of determining outcomes of playing card hands in an exemplary blackjack game, in accordance with principles of the present invention.

FIG. 16 shows a method 400 of determining the outcome of wagers, suitable for performing some or all of step 304 of FIG. 15. The method 400 starts in step 402. In step 404, the computing system 72 determines the original sequence of the playing cards 10 in the card shoe 64. For example the computing system 72 may rely on one or more transmitters 74 and antennas 78 positioned in or proximate the card shoe 64. The computing system 72 can cause the transmitter to interrogate each of the playing cards either before the playing cards 10 are removed from the card shoe 64, or during or after the playing cards 10 are removed from the card shoe 64.

In step 406, the computing system 72 determines the number of players 56 in the game. For example, the computing 72 may employ one or more transmitters 74 and antennas 78 and one or more receivers 76 and antennas 80 to detect chips 60 at various bet circles 58. The number of bet circles 58 having chips 60 indicates the number of players 56. In optional step 408, the computing system 72 determines whether the dealer 54 has blackjack. Blackjack is defined as the dealer 54 having an initial hand of two playing cards 10 with a total value equal to twenty-one. The computing system 72 may employ one or more transmitters 74 and antennas 78, as well as one or more receivers 76 and antennas 80 positioned at or proximate the dealer 64 to interrogate the dealer's cards. In this respect the computing system 72 may alternatively employ the knowledge of the original sequence and the number of players 56 to determine the value of the dealer's hand.

In optional step 410, the computing system 72 interrogates the dealer's initial hand employing one or more transmitters 74 and antennas 78 as well as one or more receivers 76 and antennas 80 positioned proximate the dealer 54. In optional step 412, the computing system 72 verifies the deal and/or sequence of playing cards using an knowledge of the original sequence and the identity of the cards forming the dealer's initial hand learned from step 410.

In step 414, the computing system 72 may optionally determine an ending sequence for the playing cards. The computing system 72 may employ one or more transmitters 74 and antennas 78 as well as one or more receivers 76 and antennas 80 positioned in or proximate the discard holder 68.

In step 416, the computing system 72 determines the player's final hands. The computing system 72 may rely on a knowledge of the original sequence, the number of players 56 and the dealer's initial hand to determine the player's final hands. Additionally, or alternatively, the computing system 72 may rely on the knowledge of the ending sequence. In step 418, the computing system 72 determines the dealer's final hand. In step 420, the computing system 72 compares the value of the player's final hand with the value of the dealer's final hand for each of the players. The method terminates at step 422.

Although specific embodiments of and examples for the wireless monitoring system and methods are described herein for illustrative purposes, various equivalent modifications can be made without departing from the spirit and scope of the invention, as will be recognized by those skilled in the relevant art. The teachings provided herein can be applied to other wireless monitoring systems, not necessarily the exemplary blackjack wireless monitoring system described above.

The various embodiments described above can be combined to provide further embodiments. All of the above U.S. patents, patent applications and publications referred to in this specification are incorporated herein by reference, in their entirety, including but not limited to U.S. Pat. No. 6,460,848, filed Dec. 30, 1999, entitled "METHOD AND APPARATUS FOR MONITORING CASINOS AND GAMING"; U.S. patent application Ser. No. 09/849,456, filed May 4, 2001, entitled "METHOD, APPARATUS AND ARTICLE FOR VERIFYING CARD GAMES, SUCH AS BLACKJACK"; and U.S. patent application Ser. No. 09/790,480, filed Feb. 21, 2001, entitled "METHOD, APPARATUS AND ARTICLE FOR EVALUATING CARD GAMES, SUCH AS BLACKJACK". Aspects of the invention can be modified, if necessary, to employ systems, circuits and concepts of the various patents, applications and publications to provide yet further embodiments of the invention.

The system may employ a transceiver rather than separate transmitter and receivers, and may employ common antennas. The methods may include additional steps, eliminate steps, and perform the steps in different orders. The playing cards can include additional layers, including protective coatings. These and other changes can be made to the invention in light of the above-detailed description. In general, in the following claims, the terms used should not be construed to limit the invention to the specific embodiments disclosed in the specification and the claims, but should be construed to include all wireless monitoring systems to track playing cards and/or wagers. Accordingly, the invention is not limited by the disclosure, but instead its scope is to be determined entirely by the following claims.

We claim:

1. A method of automating a card game, comprising:
   wirelessly interrogating each of a plurality of playing cards using radio frequency transmissions; and
   for at least some of the playing cards, determining a rank of the playing card based on the wireless interrogation using a mapping stored on a computer-readable medium that uniquely identifies playing cards based on a random distribution of conductive material, comprising a plurality of conductive particles, carried by each of the playing cards.

2. The method of claim 1 wherein wirelessly interrogating each of a plurality of playing cards comprises transmitting radio frequency energy toward the playing cards, and receiving a radio frequency signal in return from at least some of the playing cards.

3. The method of claim 1 wherein wirelessly interrogating each of a plurality of playing cards comprises transmitting radio frequency energy toward the playing cards and receiving a radio frequency signal in return from at least some of the playing cards, while the playing cards are in a card shoe.

4. The method of claim 1 wherein wirelessly interrogating each of a plurality of playing cards comprises transmitting radio frequency energy toward the playing cards and receiving a radio frequency signal in return from at least some of the playing cards while the playing cards are being withdrawn from a card shoe.

5. The method of claim 1 wherein determining a rank of the playing card based on the wireless interrogation comprises decoding a radio frequency signal received from at least one of the playing cards in response to the wireless interrogation.

6. The method of claim 1, further comprising wirelessly interrogating each of a plurality of wagering chips using radio frequency transmissions.

7. The method of claim 1, further comprising:
   wirelessly interrogating each of a plurality of wagering chips using radio frequency transmissions;
   determining a value of each of a number of wagers based on the wireless interrogation of the wagering chips; and
   determining an outcome of at least one wager based on the determined rank of the playing cards and the determined value of the wagers.

8. The method of claim 1 wherein:
   the playing card bears human-readable rank and suit marking; and
   the conductive material includes the plurality of conductive particles distributed within at least a portion of the human-readable rank and suit markings.

9. The method of claim 1 wherein conductive material carried by the playing card comprises a trace etched from a conductive layer deposited on at least one surface of the playing card.

10. A method of identifying playing cards, comprising:
    for each playing card:
      transmitting at least a first radio frequency interrogation signal;
      receiving a radio frequency response from the playing card; and
      determining a value of the playing card based on the received radio frequency response using a mapping stored on a computer-readable medium that uniquely identifies playing cards based on a random distribution of conductive material, comprising the plurality of conductive particles, carried by each of the playing cards.

11. The method of claim 10 wherein determining a value of the playing card based on the received radio frequency response comprises determining a position on the playing card from which the response emanates.

12. The method of claim 10 wherein determining a value of the playing card based on the received radio frequency response comprises determining whether the response is received at a first antenna or a second antenna, spaced across and radio frequency barrier from the first antenna.

* * * * *